US009584570B2

(12) United States Patent
Neff

(10) Patent No.: US 9,584,570 B2
(45) Date of Patent: Feb. 28, 2017

(54) DYNAMIC MEDIA TRANSCODING FOR P2P COMMUNICATIONS

(71) Applicant: Pelco, Inc., Clovis, CA (US)

(72) Inventor: Bryan K. Neff, Fresno, CA (US)

(73) Assignee: Pelco, Inc., Andover, MA (US)

( * ) Notice: Subject to any disclaimer, the term of this patent is extended or adjusted under 35 U.S.C. 154(b) by 0 days.

(21) Appl. No.: 14/228,848

(22) Filed: Mar. 28, 2014

(65) Prior Publication Data

US 2015/0281301 A1   Oct. 1, 2015

(51) Int. Cl.
| | |
|---|---|
| *H04N 7/173* | (2011.01) |
| *H04L 29/06* | (2006.01) |
| *H04N 21/44* | (2011.01) |
| *H04L 29/08* | (2006.01) |
| *H04N 21/2343* | (2011.01) |
| *H04N 21/24* | (2011.01) |
| *H04N 13/00* | (2006.01) |
| *H04N 21/2187* | (2011.01) |
| *H04N 21/414* | (2011.01) |

(52) U.S. Cl.
CPC .......... *H04L 65/60* (2013.01); *H04L 65/4084* (2013.01); *H04L 65/605* (2013.01); *H04L 65/80* (2013.01); *H04L 67/104* (2013.01); *H04N 21/234363* (2013.01); *H04N 21/2402* (2013.01); *H04N 21/44* (2013.01); *H04N 21/2187* (2013.01); *H04N 21/41407* (2013.01)

(58) Field of Classification Search
CPC ............... H04N 21/44; H04N 21/4402; H04N 21/234309; H04N 21/234363; H04N 21/234372; H04N 21/234381; H04N 21/238

USPC ......................................... 725/116
See application file for complete search history.

(56) References Cited

U.S. PATENT DOCUMENTS

| | | | |
|---|---|---|---|
| 2002/0191722 A1* | 12/2002 | Naruse | H04L 1/0003 375/358 |
| 2006/0165083 A1* | 7/2006 | Lee | H04L 29/12188 370/392 |
| 2010/0034257 A1 | 2/2010 | Sedeffow | |

(Continued)

FOREIGN PATENT DOCUMENTS

WO   WO 2015/148963   10/2015

OTHER PUBLICATIONS

International Search Report and Written Opinion for PCT/US15/23061 dated Jul. 2, 2015 entitled "Dynamic Media Transcoding for P2P Communications".

(Continued)

*Primary Examiner* — Pankaj Kumar
*Assistant Examiner* — Reuben M Brown
(74) *Attorney, Agent, or Firm* — Hamilton, Brook, Smith & Reynolds, P.C.

(57) ABSTRACT

An apparatus for distributing video content includes one or more video input modules each adapted to receive a video signal from a video source, and a video combiner for receiving the video signals from the one or more video inputs and generating a video packet data stream. The apparatus also includes at least one video output module adapted to transmit the video packet data stream, and a processor coupled to the video combiner and the at least one video output. The processor cooperates with one or both of the video combiner and the at least one video output to transcode at least a portion of the video packet data stream.

20 Claims, 3 Drawing Sheets

(56) References Cited

U.S. PATENT DOCUMENTS

| | | | |
|---|---|---|---|
| 2011/0022733 A1* | 1/2011 | Karaoguz | H04L 67/2833 709/247 |
| 2011/0093605 A1* | 4/2011 | Choudhury | H04L 65/4084 709/231 |
| 2012/0005361 A1 | 1/2012 | Knittle | |
| 2012/0093017 A1* | 4/2012 | Liu | H04N 21/2383 370/252 |
| 2012/0163203 A1 | 6/2012 | Wilkinson et al. | |
| 2013/0010058 A1* | 1/2013 | Pomeroy | H04N 13/0048 348/43 |
| 2013/0166711 A1 | 6/2013 | Wang et al. | |
| 2013/0204927 A1* | 8/2013 | Kruglikov | G06F 9/54 709/203 |
| 2013/0219073 A1* | 8/2013 | Dong | H04L 65/605 709/231 |
| 2013/0263167 A1* | 10/2013 | Parthasarathy | H04L 41/5067 725/14 |
| 2014/0007175 A1* | 1/2014 | Cho | H04N 21/6379 725/116 |
| 2014/0032658 A1* | 1/2014 | Falls | H04N 21/234309 709/204 |
| 2014/0118541 A1* | 5/2014 | Lasko | 348/143 |
| 2015/0007237 A1* | 1/2015 | Good | 725/92 |
| 2015/0189542 A1* | 7/2015 | Cazanas | H04W 28/0289 370/312 |

OTHER PUBLICATIONS

International Preliminary Report on Patentability for PCT/US2015/023061 dated Oct. 4, 2016 entitled "Dynamic Media Transcoding For P2P Communications".

* cited by examiner

DYNAMIC MEDIA TRANSCODING FOR P2P COMMUNICATIONS

BACKGROUND OF THE INVENTION

Most video distribution over the Internet concerns static content (e.g., pre-recorded material such as movies and television shows), for which latency is not an issue. In the case of static content, delayed video packets can be handled by buffering prior to presenting the video.

Live video broadcasts are different in that they cannot tolerate significant latency issues. Two common types of live video are video conferencing and video surveillance.

One option for dealing with latency is simply to drop a packet that is delayed too long. Provided that a relatively small number of packets are dropped, video conferencing can tolerate such packet drops. The resulting video quality may be reduced temporarily, but for most video conferencing applications, this is acceptable.

For video surveillance transmissions, such a drop in video quality cannot be allowed to occur. Applications that use surveillance video typically rely on details contained in the video, so a certain quality threshold must be maintained.

Video may be distributed using a wide range of graphics display resolution levels (or more briefly "resolution levels"). Examples of resolution levels include QVGA, HVGA, VGA, SVGA, XGA, WXGA and XGA+. Such a wide range of resolution levels are necessary because of a corresponding wide range of client platforms, e.g., anything from a cell phone to a video monitor, which can include notebook computers, tablets, laptops, among others. Each type of client platform typically has a particular resolution level that is optimal for that platform.

The initial resolution level for video distribution is established at a receiving end of the video distribution path because the wide variety of potential clients makes it difficult for a video distributor to make the resolution level decision.

Changes in network traffic conditions may require a change in the resolution level. For example, suppose a video is initially broadcast at an SVGA level. If the available bandwidth drops to a point at which the desired frame rate cannot be maintained, the client/receiver may decide to change to a lower resolution level (e.g., from SVGA to HVGA). The resulting image may not look as good as it did with the initial resolution, but the lower resolution may permit the desired frame rate at the reduced network bandwidth.

SUMMARY OF THE INVENTION

Conversion of the original, high-resolution video content to a resolution level suitable for a particular client is referred to herein as "transcoding." To convert the content from one resolution level to another resolution level is to "transcode" the content.

As used herein, the term "traffic conditions" includes parameters, such as bitrate, data throughput, data latency, rate of packet loss, and bit error rate.

As used herein, the term "video" or "video material" may include audio information as well as video information.

Embodiments described herein are related to a system described in US 2013/0166711 to Wang et al., entitled "Cloud-Based Video Surveillance Management System," published Jun. 27, 2013, the content of which is hereby incorporated by reference in its entirety.

The described embodiments may operate to select a suitable transcoding rate, based on traffic conditions, in order to maintain a particular video frame rate at the destination of the transmitted video.

In one aspect, the described embodiments may provide transcoding decisions at the video distribution source rather than at the destination.

In another aspect, the described embodiments may provide a capability of predicting network traffic conditions and basing transcoding decisions on the predicted network traffic conditions.

In another aspect, the described embodiments may provide a capability of maintaining a record of past video distribution events with respect to a particular client and using that record as an input for determining an initial resolution level.

In one aspect, the described embodiments include an apparatus for distributing video content. The apparatus includes one or more video input modules, each adapted to receive a video signal from a video source. The apparatus also includes a video combiner that receives the video signals from the one or more video input modules and generates a video packet data stream, and at least one video output module adapted to transmit the video packet data stream. The apparatus further includes a processor coupled to the video combiner and the at least one video output module. The processor is configured to cooperate with one or both of the video combiner and the at least one video output module to transcode at least a portion of the video packet data stream.

In one embodiment, the video combiner is configured to store the video signals from the one or more video input modules. In another embodiment, the video combiner further includes a memory device configured to store the video signals from the one or more video input modules. In yet another embodiment, the processor is configured to receive information describing traffic conditions between the at least one video output and a destination of the video packet data stream, and to use the information to determine how to transcode the at least a portion of the video packet data stream.

In another embodiment, the information describing traffic conditions includes prediction data that predicts upcoming traffic conditions. The apparatus may receive prediction data from the destination of the video packet data stream.

In one embodiment, the processor is further configured to use information about prior transcoding associated with a destination of the video packet data stream to determine an initial transcoding. The processor may be configured to collect and store transcoding information associated with the destination of the video packet data stream, and to use the stored transcoding to determine an initial transcoding.

In another embodiment, the at least one video output module is configured to transmit the video packet data stream in a format compatible with network communications.

In another aspect, the described embodiments include a method of distributing video content. The method includes combining, at a video source, one or more video signals to generate a video packet data stream. The method further includes determining at the video source, based on traffic conditions, a transcoding level at which to transmit the video packet data stream. The method also includes transmitting, from the video source, the video packet data stream at the determined transcoding level.

One embodiment further includes receiving traffic prediction data from a destination of the video packet data stream.

The traffic prediction data is at least a component of the traffic conditions. Another embodiment further includes using information describing past transcoding associated with a destination of the video packet data stream to determine an initial transcoding level. Yet another embodiment further includes collecting and storing transcoding information associated with the destination of the video packet data stream, and using the stored transcoding information to determine the initial transcoding level.

An embodiment further includes calculating, at the destination of the video packet data stream, the traffic prediction data. Calculating the traffic prediction data may use, as an input, one or more of IP addresses, time of day, bitrate maximum/minimum, GPS coordinates, error counts and video server load.

In another aspect, the described embodiments include a tangible, non-transitory, computer readable medium for storing computer executable instructions for providing a hybrid storage array function. The computer executable instructions are for combining one or more video signals to generate a video packet data stream, and determining, based on traffic conditions, a transcoding level at which to transmit the video packet data stream. The computer executable instructions are further for transmitting the video packet data stream at the determined transcoding level.

One embodiment further includes instructions for receiving traffic prediction data from a destination of the video packet data stream. The traffic prediction data is at least a component of the traffic conditions. Another embodiment includes instructions for using information describing past transcoding associated with a destination of the video packet data stream to determine an initial transcoding level. Yet another embodiment includes instructions for collecting and storing transcoding information associated with the destination of the video packet data stream, and using the stored transcoding information to determine the initial transcoding level.

Another embodiment includes instructions for calculating the traffic prediction data uses, as an input, one or more of IP addresses, time of day, bitrate maximum/minimum, GPS coordinates, error counts and video server load.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

One or more of the described embodiments operate to select a suitable transcoding rate, based on traffic conditions, in order to maintain a particular video frame rate at the destination of the transmitted video. The described embodiments implement transcoding decisions at the video distribution source, rather than at the destination, which may improve responsiveness to changing traffic conditions. The described embodiments may provide a capability of predicting network traffic conditions and making transcoding decisions based on the predicted network traffic conditions. The described embodiments may maintain a record of past video distribution events with respect to a particular client, and use that record as an input to an analysis for determining an initial resolution level.

Figure 1:
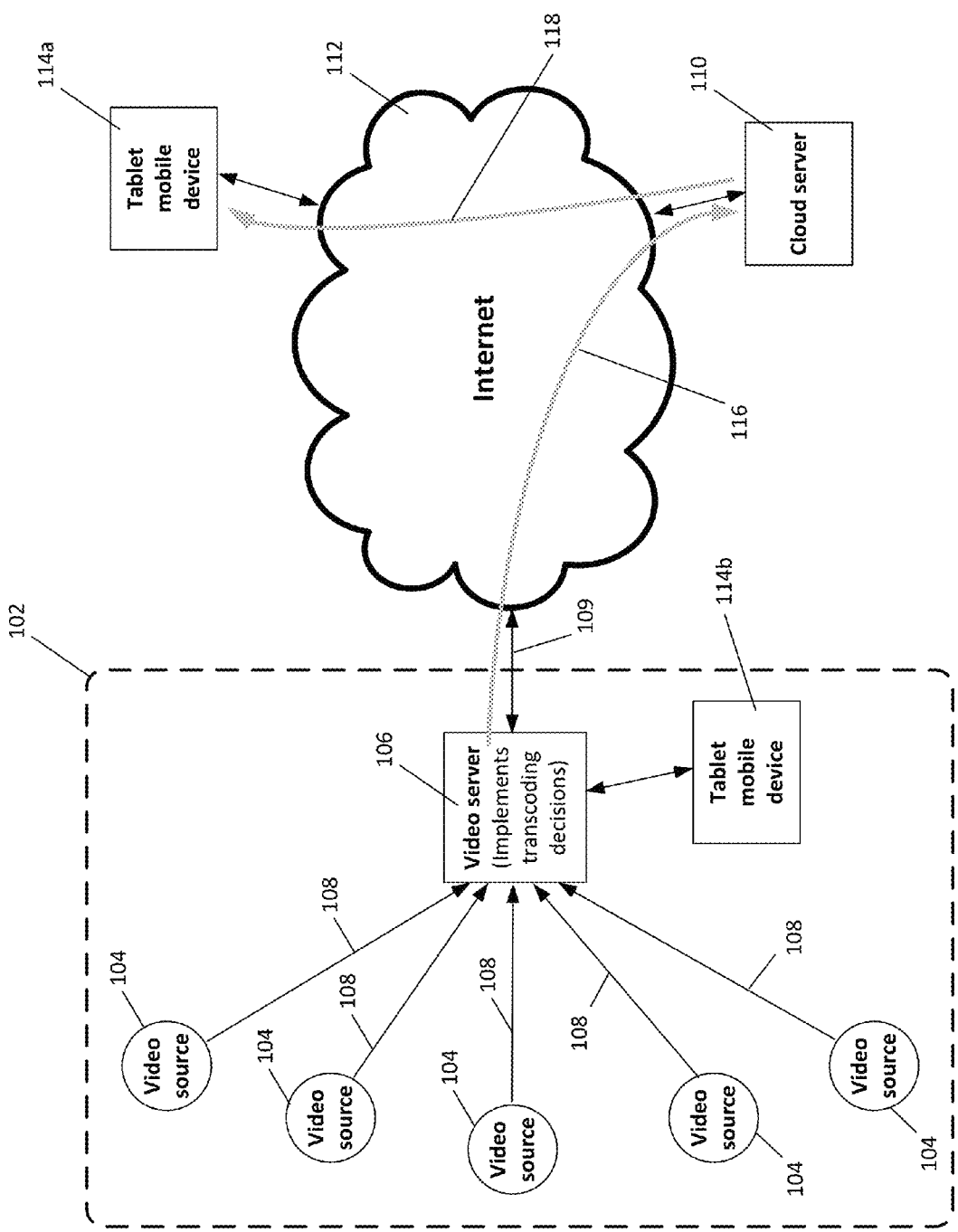
FIG. 1 is a network diagram of an example video distribution architecture constructed and arranged according to the described embodiments.

FIG. 1 shows an example of a video distribution architecture constructed and arranged according to the described embodiments. In this example, a local area 102 contains one or more video sources 104 each connected to a video server 106. The local area 102 may be, for example, a small food or liquor store. The video sources 104 may be video cameras installed at various locations within the store. The video sources may output a digital video signal that can be transported in data packets or stored in digital storage media. In other embodiments, the video sources may output an analog video signal that may be sampled and digitized to produce a digital video signal. As used herein, the term "video signal" may describe an analog video signal or a digital video signal.

The video server 106, also installed within the store in some deployments, receives the video information 108 from each of the video sources 104, and sends video information from some or all of the video sources away from the local area 102. In this example, the video server 106 conveys the combined video information to a video data destination (in this case a cloud server 110) through the Internet 112 (or other wide area network—not shown), along example path 116. Other communications paths, such as a cellular communications (e.g., LTE) or WiFi may alternatively be used.

A communications link 109 between the video server 106 and the cloud server 110 in this example is bi-directional, so that information can flow from the cloud server 110 to the video server 106 as well as from the video server 106 to the cloud server 110. In other embodiments, the communications link 109 may be unidirectional.

A remote mobile device 114a, for example a tablet-style mobile device (e.g., an iPad®), may communicate with the cloud server 110 through the Internet 112 along example path 118 to allow a user to view the video provided by the video server 106 to the cloud server 110. Alternatively, the mobile device 114a may communicate locally and directly with the cloud server 110.

In another embodiment, a local mobile device 114b may be used to communicate directly with the video server 106, within the local area 102. Alternatively, a remote mobile device 114a may communicate with the video server 106 directly through the Internet (i.e., not through the cloud server 110).

The video server 106 can provide video to the cloud server 110 at any of several different resolution levels. Determining a particular resolution level is referred to herein as a "transcoding decision." The video server 106 determines an appropriate resolution level based on traffic conditions (e.g., available bandwidth, latency, etc.) along with a goal of supporting a particular video frame rate (e.g., 30 frames per second). In one embodiment, the video server 106 analyzes traffic to/from the cloud server to determine current traffic conditions.

In another embodiment, the cloud server analyzes information communicated from the video server 106 through the Internet 112 to determine traffic conditions, and provides the determined traffic condition information to the video server 106. The cloud server 110 may use one or more techniques for predicting future traffic conditions based on current traffic conditions and other local parameters, and provide information about the predicted traffic conditions to the video server 106.

While the video server 106 can determine an appropriate resolution level based on empirically-determined traffic conditions once it begins to communicate with the cloud server 110, the video server 106 determines an initial resolution level before any measured traffic conditions are available. In one embodiment, the video server 106 uses the highest available resolution level as an initial resolution level. In another embodiment, the video server 106 maintains a record of the resolution level or levels used previously by this particular client (i.e., the cloud server 110), and bases the initial resolution level on the previously-used resolution level(s).

Figure 2:
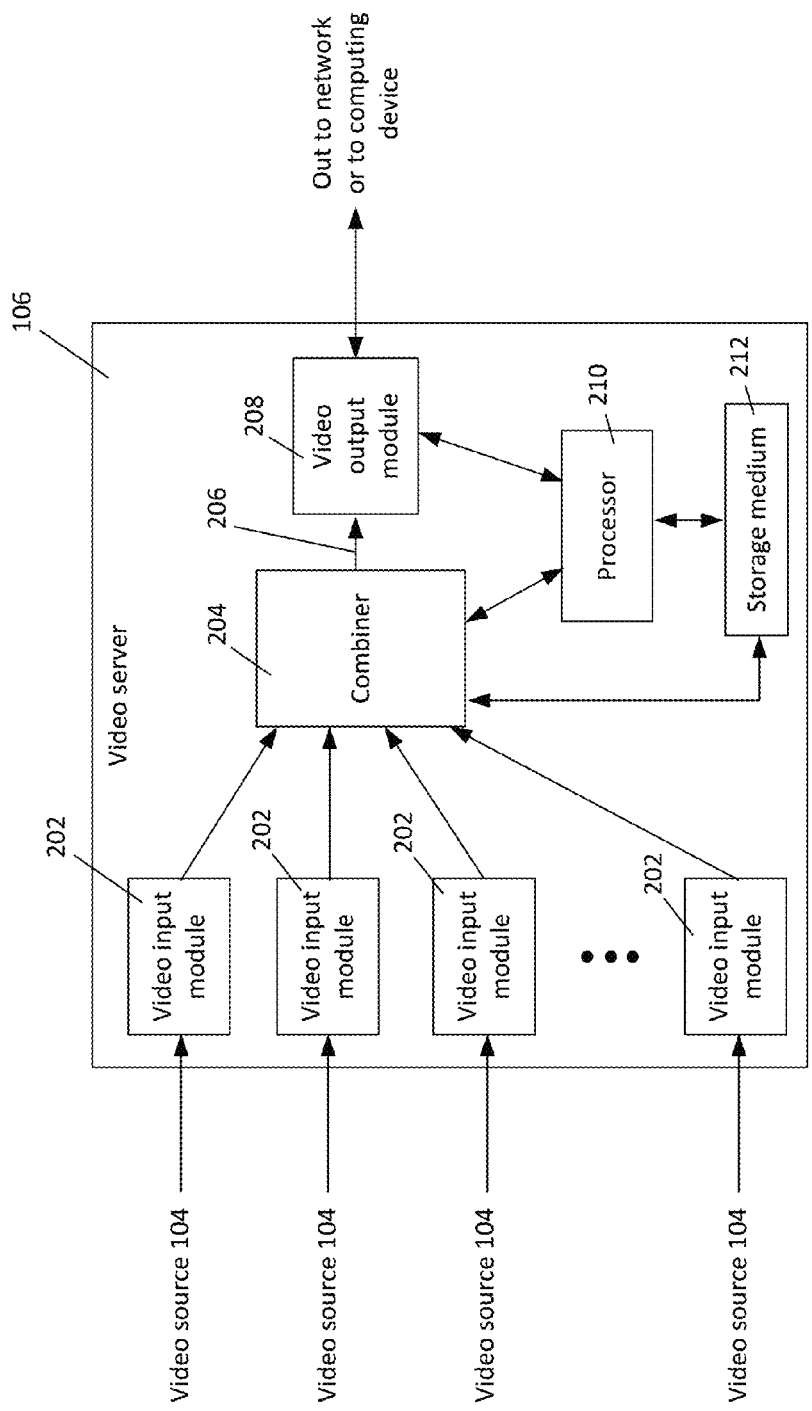
FIG. 2 is a detailed view of an example video server of FIG. 1.

FIG. 2 is a more detailed view of the video server 106 of FIG. 1. The video server 106 includes a number of video input modules 202, each of which receives a video signal from one of the video sources 104. Each video input module 202 processes the received video signal if necessary (e.g., if the raw video information is to be digitized and/or packetized, or if the video information requires specific formatting) and provides the video information to a combiner 204.

The combiner 204 receives the video information from all of the video sources 104 and, optionally, stores the video information in a digital storage medium 212, such as a hard drive, FLASH memory, or other suitable storage devices known in the art. The combiner 204 may also access the video information stored in the digital storage medium 212 and produce a video packet data stream 206 that includes the video information from one or more of the video sources. The combiner 204 thus functions similar to a digital video recorder (DVR), both for video storage and for digital retrieval. In some embodiments, the digital storage medium 212 allows simultaneous storage and retrieval of data (i.e., simultaneous reading and writing).

In another embodiment, the combiner 204 may produce a video packet data stream 206 directly from the input video modules 202, without storing the video data.

A video output module 208 receives the video packet data stream 206 and transmits the video packet data stream to an external destination, such as a network input (e.g., the Internet) or a local computing device (e.g., a mobile phone, laptop or notepad device). The video output module 208 transmits the video packet data stream in a format compatible with network communications, such as (but not limited to) TCP/IP or Fibre Channel.

The video server 106 further includes a processor 210 that cooperates with the combiner 204, the video output module 208, and other associated components to handle and process the received video information. For example, the processor 210 may use information about the traffic conditions into which the video output module 208 transmits, to determine how the video packet data stream 206 should be transcoded. As another example, the processor 210 may keep track of transcoding information for certain destinations, and use that historical transcoding information to determine an initial transcoding level for a particular destination. The processor 210 may also communicate with digital storage medium 212, which may store instructions for the processor to execute, and may provide media to store video data generated by the video sources 104.

The processor 210 may communicate through, for example, the video output module 208, with a destination device, such as the cloud server 110 of FIG. 1, to receive traffic prediction data from the destination device. The traffic prediction data provides information associated with traffic conditions of upcoming communications (e.g., expected available bitrate or latency). In one embodiment, the destination device 110 evaluates traffic communicated between the video server 106 and the destination device 110 to generate the traffic prediction data.

The processor 210 is understood to include supporting hardware and software that is not explicitly shown in FIG. 2. For example, the processor 210 includes volatile and non-volatile memory for storing instructions and other data. The processor may also include components to allow user input and interaction, such as a keyboard or keypad, a mouse, and a display.

Figure 3:
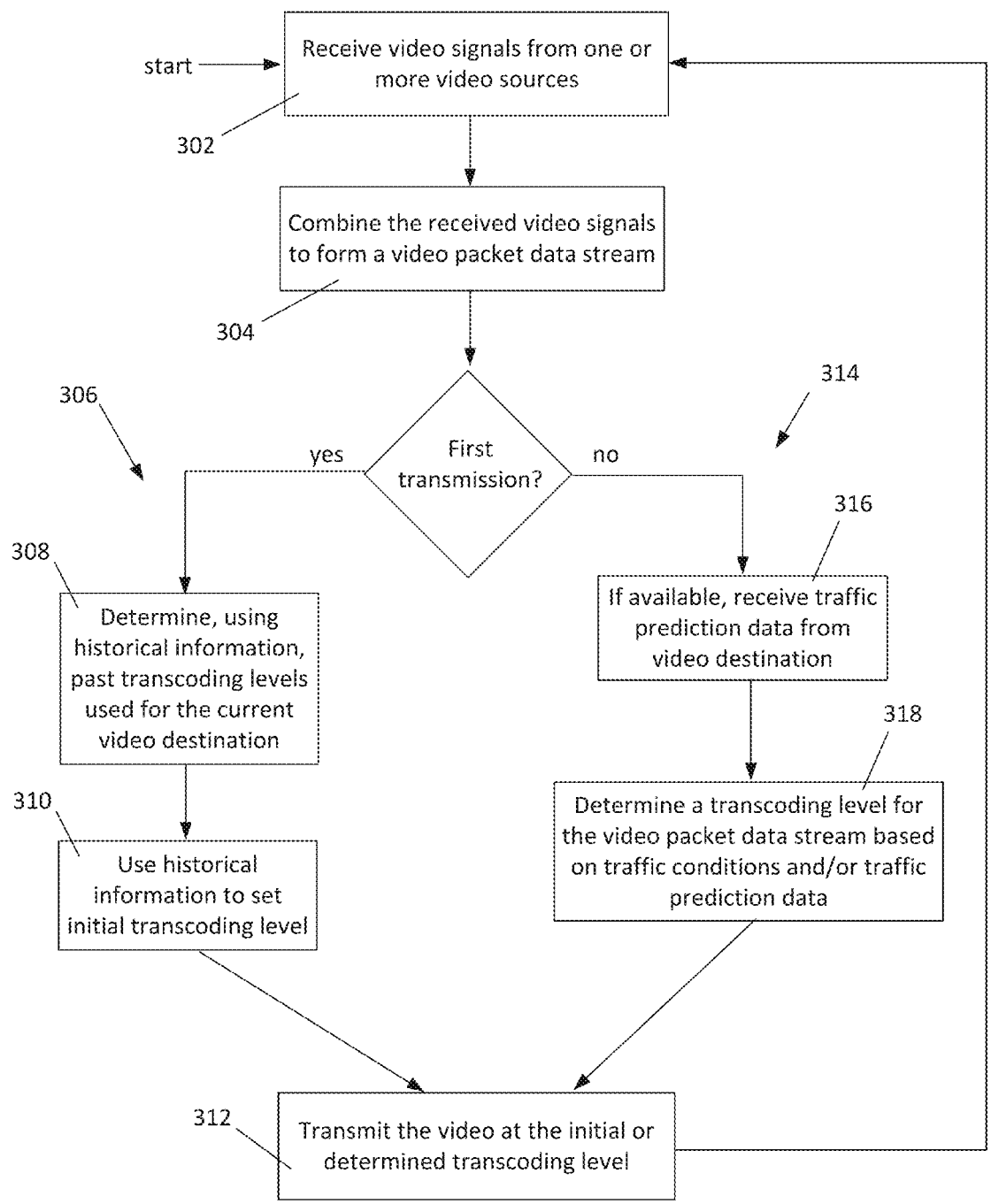
FIG. 3 is a flow diagram according to the described embodiments.

FIG. 3 illustrates an example procedural flow of one described embodiment. The procedure begins by receiving 302 video signals from one or more video sources. The procedure combines 304 the video signals to form a video packet data stream. Upon the initial transmission 306, the procedure determines 308 past transcoding levels used previously by the video data destination (e.g., a client to which video data is to be sent). The procedure uses past transcoding levels to determine 310 an initial transcoding level for transmission. Notably, a transcoding level that was used previously by the source may be used to initialize the current transmission. The procedure then transmits 312 the video at the initial transcoding level.

Upon subsequent transmissions 314, the procedure receives traffic prediction data 316 from the video destination and uses the prediction data to determine 318 a transcoding level for the video packet data stream. Alternatively, other information concerning traffic conditions may be used instead of, or in addition to, the prediction data to determine a transcoding level.

Several techniques may be used to generate the traffic prediction data described herein. The traffic prediction data may include, for example, bitrate, although other parameters associated with data communications may also be used. The following are examples of paths, the analysis of which may be used to generate traffic prediction data:

1. Video server to cloud server
2. Cloud server to mobile device (e.g., tablet device)
3. Mobile device to cloud server
4. Mobile device to video server For some paths (e.g., 1 and 2), the prediction data may be measured as it leaves the transmitting device (i.e., the video server and the cloud server). For other paths (e.g., 3 and 4), the prediction data may be measured at the receiving device (again, the cloud server and the video server). Traffic prediction data analysis with respect to the paths described above use the video server and/or cloud server for data collection due to the servers' generally superior processing power, as compared to client-type devices such as mobile phones, tablet devices and laptop or netbook computers. In some embodiments, however, prediction data may be measured both leaving the transmitting device and entering the receiving device.

In some embodiments, certain characteristics associated with a communications path destination (e.g., client) may be used to predict traffic conditions. Such characteristics may include the following, although other similar characteristics may also be used:

1. IP addresses
2. Time of day (TOD)
3. Bitrate minimum/maximum
4. GPS coordinates 5. Error counts
6. Video server load (CPU, Bandwidth, Memory)

For example, previous experience with a client may indicate that a particular IP address corresponds to a specific bitrate. As another example, past experience with a client may show a certain correlation between TOD and available bitrate, thereby allowing the use of TOD to predict traffic conditions. For yet another example, past experience with a client may indicate a correlation between client location (i.e., GPS coordinates) and bitrate, so that client location may be used as a parameter for traffic condition prediction. In general, the traffic condition prediction may be based on any one of these types of characteristics, or any combination of the characteristics. Regardless of whether the prediction determination is performed at the sending end or the receiving end of the communications link, the prediction information is conveyed to the video server, so that the video server can use the prediction information to select a transcoding rate.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for distributing video content, comprising:
    one or more video input modules each adapted to receive a video signal from a video source;
    a video combiner that receives the video signals from the one or more video input modules and generates a video packet data stream;
    at least one video output module adapted to transmit the video packet data stream to a destination device; and
    a processor coupled to the video combiner and the at least one video output module, the processor configured to cooperate with one or both of the video combiner and the at least one video output module to resolution-transcode at least a portion of the video packet data stream, the processor configured to use traffic prediction data generated by the destination device to determine how to resolution-transcode the at least a portion of the video packet data stream transmitted to the destination device, to maintain a particular video frame rate at the destination device.

2. The apparatus of claim 1, wherein the video combiner is configured to store the video signals from the one or more video input modules.

3. The apparatus of claim 2, wherein the video combiner further includes a memory device configured to store the video signals from the one or more video input modules.

4. The apparatus of claim 1, wherein the processor is configured to receive information describing traffic conditions between the at least one video output and a destination of the video packet data stream, and to use the information to determine how to resolution-transcode the at least a portion of the video packet data stream.

5. The apparatus of claim 4, wherein the information describing traffic conditions includes prediction data that predicts upcoming traffic conditions.

6. The apparatus of claim 5, wherein the apparatus receives prediction data from the destination of the video packet data stream.

7. The apparatus of claim 1, wherein the processor is further configured to use information about prior resolution-transcoding associated with a destination of the video packet data stream to determine an initial resolution-transcoding.

8. The apparatus of claim 7, wherein the processor is configured to collect and store resolution-transcoding information associated with the destination of the video packet data stream, and to use the stored transcoding to determine an initial resolution-transcoding.

9. The apparatus of claim 1, wherein the at least one video output module is configured to transmit the video packet data stream in a format compatible with network communications.

10. A method of distributing video content, comprising:
    combining, at a video source, one or more video signals to generate a video packet data stream;
    determining at the video source, based on traffic prediction data generated by a destination device, a resolution-transcoding level at which to transmit the video packet data stream to maintain a particular video frame rate at the destination device; and
    transmitting, from the video source, the video packet data stream at the determined resolution-transcoding level.

11. The method of claim 10, further comprising receiving the traffic prediction data from a destination of the video packet data stream, wherein the traffic prediction data is at least a component of traffic conditions.

12. The method of claim 10, further comprising using information describing past transcoding associated with a destination of the video packet data stream to determine an initial resolution-transcoding level.

13. The method of claim 12, further comprising collecting and storing resolution-transcoding information associated with the destination of the video packet data stream, and using the stored transcoding information to determine the initial resolution-transcoding level.

14. The method of claim 10, further comprising calculating, at the destination of the video packet data stream, the traffic prediction data.

15. The method of claim 14, wherein calculating the traffic prediction data uses, as an input, one or more of IP addresses, time of day, bitrate maximum/minimum, GPS coordinates, error counts and video server load.

16. A tangible, non-transitory, computer readable medium for storing computer executable instructions for distributing video content, with the computer executable instructions for:
 combining one or more video signals to generate a video packet data stream;
 determining, based on traffic prediction data generated by a destination device, a resolution-transcoding level at which to transmit the video packet data stream to maintain a particular video frame rate at the destination device; and
 transmitting the video packet data stream at the determined resolution-transcoding level.

17. The computer readable medium of claim 16, further comprising instructions for receiving the traffic prediction data from a destination of the video packet data stream, wherein the traffic prediction data is at least a component of traffic conditions.

18. The computer readable medium of claim 16, further comprising instructions for using information describing past transcoding associated with a destination of the video packet data stream to determine an initial resolution-transcoding level.

19. The computer readable medium of claim 18, further including instructions for collecting and storing transcoding information associated with the destination of the video packet data stream, and using the stored transcoding information to determine the initial resolution-transcoding level.

20. The computer readable medium of claim 18, wherein the instructions for calculating the traffic prediction data uses, as an input, one or more of IP addresses, time of day, bitrate maximum/minimum, GPS coordinates, error counts and video server load.

* * * * *